Dec. 16, 1930. G. F. HOPKINS 1,785,349
PNEUMATIC ENGINE CYLINDER AND CONTROL FOR LATHE CHUCKS AND THE LIKE
Filed Feb. 19, 1927
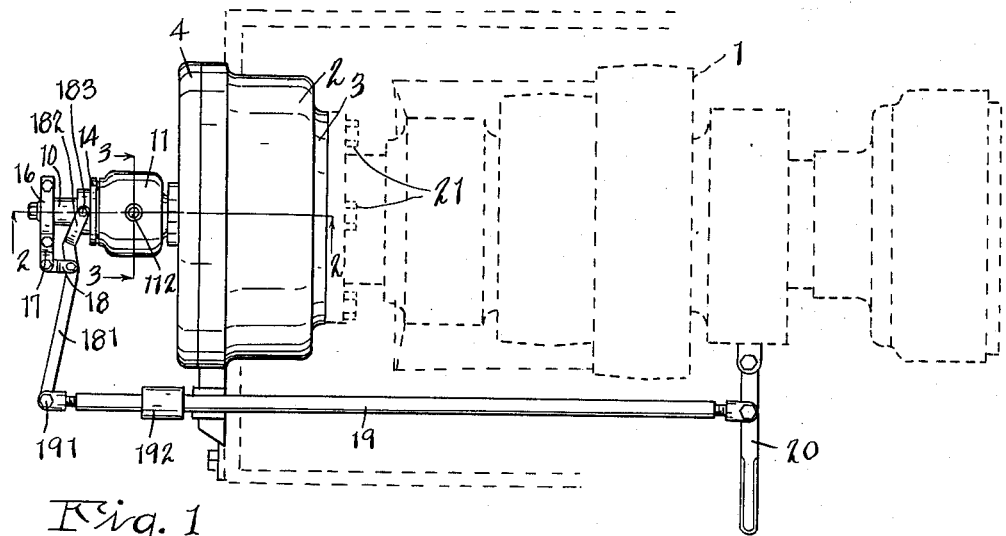
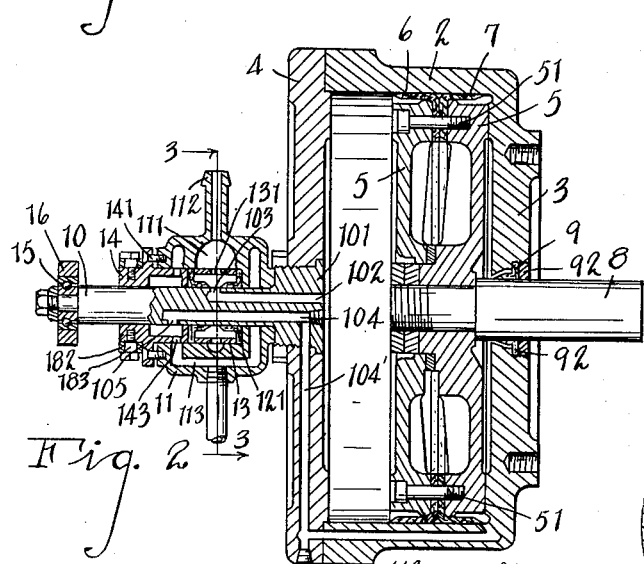
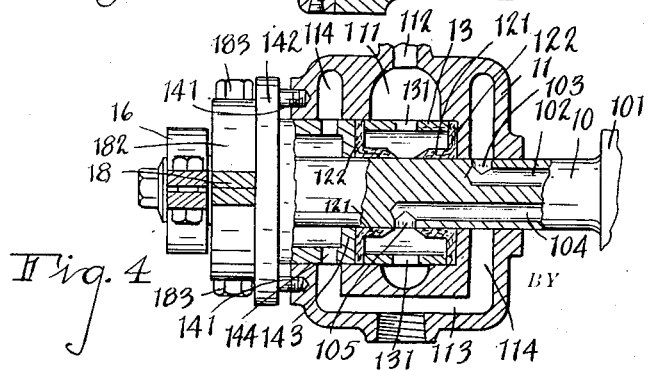
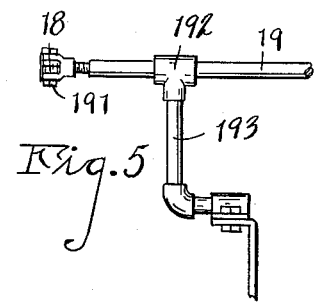
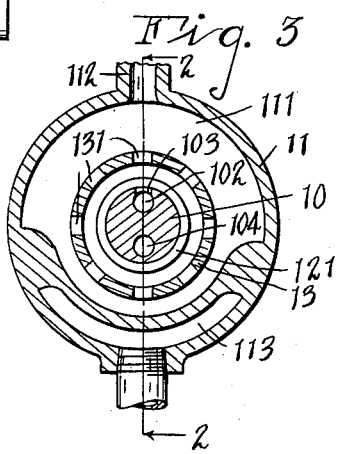
INVENTOR
George F. Hopkins
Chappell & Earl
ATTORNEYS Patented Dec. 16, 1930

1,785,349

UNITED STATES PATENT OFFICE

GEORGE F. HOPKINS, OF JACKSON, MICHIGAN; WILLIAM K. SAGENDORPH EXECUTOR OF SAID GEORGE F. HOPKINS

PNEUMATIC ENGINE CYLINDER AND CONTROL FOR LATHE CHUCKS AND THE LIKE

Application filed February 19, 1927. Serial No. 169,501.

The objects of the invention are:

First, to provide direct air connection means to the engine cylinders for pneumatic control.

Second, to provide an improved control valve mechanism.

Third, to provide an improved valve mechanism with improved packing means.

Fourth, to provide an improved packing means for the piston and piston rod of such a structure.

Objects relating to details and economies of construction and operation of my invention will appear from the detailed description to follow.

The invention is defined and pointed out in the claims.

A structure which is a preferred embodiment of my invention is illustrated in the accompanying drawing, forming a part of this application, in which:

Fig. 1 is a detail view of my improved engine cylinder and valve shown in full lines in position on a lathe indicated by dotted lines.

Fig. 2 is an enlarged detail vertical longitudinal sectional view on line 2—2 of Figs. 1 and 3, showing details of the valve, cylinder, piston and packing.

Fig. 3 is a still further enlarged detail transverse sectional view on line 3—3 of Figs. 1 and 2.

Fig. 4 is a sectional view on line 4—4 of Fig. 1, being a section of the slide valve, similar to that of Fig. 2 with the valve shifted to the "out" position.

Fig. 5 is a detail elevation view of the transversely movable support for the valve control.

The parts will be identified by their numerals of reference which are the same in all views.

1 is the hollow live spindle of a lathe. 2 is my improved air cylinder having an integral head 3 and secured to an adapter flange on the lathe spindle by cap screws 21.

4 is the detachable head of my improved engine cylinder. 5 is the piston divided transversely in equal parts which are retained together by suitable screws 51. These parts are provided with bead-like flanges 52 at their meeting faces. Clamped between them are outwardly projecting hydraulic packing cups 6, 7 closely forming effective cylinder packing. 8 is the engine piston rod extending through the head and hollow spindle to operate the lathe chuck. 9 is the packing therefor which is a special cupped leather or rubber composition with a tubular inner part 91 and an outwardly projecting flange part 92 which is clamped by a suitable nut 93, as clearly seen in Fig. 2. This provides an exceedingly effective stuffing box structure.

10 is the extended spindle secured by suitable joint 101 centrally on the removable head 4 of my improved engine cylinder. My improved slide valve 11 slides on this revoluble rod 10. This spindle or rod 10 which is co-axial with the piston rod 8 forms a journal and sliding support for my slide valve 11. The rod 10, which serves a double purpose, is provided with a passage 102 opened by lateral port 103 one side of the rod 10 and connecting to one side of cylinder 2. It is provided also with the passage 104 which is extended at 104' to the opposite end of the cylinder and is connected by lateral port 105 to one side of the said shaft 10 in spaced relation to port 103, thus forming two different ports differently spaced on the shaft 10 from the said cylinder. These ports are the control ports for the inlet and exhaust of the air which drives the engine piston.

11 is the cylindrical slide valve adjusted to reciprocate upon this journal rod support 10. It is provided with a central annular air intake chamber 111 to which air is delivered through a suitable coupling 112. It has annular outlet chambers 114 at each side of the inlet which are connected by passage 113 and discharges at 113'. Packings are provided for this sliding valve comprising special cup packings. Each is provided with a central tubular part 121 with a projecting flange 122. There is a pair of these packings oppositely facing each other in spaced relation, as seen in Figs. 2 and 3. These packings are retained and clamped in place by a tubular clamp piece 13 provided with central radial perforations 131 to connect the intake chamber 111. This clamp engages the peripheries of the flanges, thus supporting the packings flexibly in position to completely conform to any irregularity in the piston rod.

A clamp 14 is provided to retain these parts which is held in place by a pair of screws 141 through lugs 142. The clamp head 14 has an inwardly projecting flange 143 to provide support for the flange 122 of the outer packing. This clamp head 14 is perforated at 144 radially for the passage of air to the exhaust 114.

15 is a roller bearing carried on the outer end of the rod 10. It is embraced by a collar 16 having a lateral arm 17 which supports the forked lever 18 by the link 181 on which said lever 18 is fulcrumed. The lever 18 is bifurcated at 182 and connected by pivots 183 to the slide valve 11. The lever 18 is actuated by the connecting rod 19 pivoted thereto at 191 and extended to the hand lever 20 fulcrumed on the side of the lathe. The connecting rod 19 is provided with a support 193 and slides through bearing 192 thereon. The support 193 is pivoted to the frame at its lower end to permit the lateral movement of the connecting rod 19 to accommodate the swing of lever 18 and support its outer end in proper operative relation to the engine cylinder.

Having thus described my invention, what I claim as new and desire to secure by Letters Patent, is:

1. An engine cylinder with means to secure the same to the hollow spindle of a lathe, a piston with rod extended and adapted to actuate the lathe chuck, an axially disposed journal rod on the opposite cylinder head with longitudinal bores and lateral ports at different distances thereon, the longitudinal bores being extended into and connecting the opposite ends of the engine cylinder, a slide valve supported on the said journal rod having a central supply chamber and exhaust chambers at each side, a packing within the valve comprising oppositely disposed cup members with opposed tube parts in spaced relation to each other, each having an outwardly projecting flange, a clamping thimble between the said cup members forming a chamber around the tubular parts and perforated laterally midway of its length, and a clamping head for retaining the said cup members and clamping thimble in place to reciprocate and revolubly engage the said rod.

2. An engine cylinder with means to actuate the same to the hollow spindle of a lathe, a piston with rod extended and adapted to actuate the lathe chuck, an axially disposed journal rod on the opposite cylinder head with longitudinal bores and lateral ports at different distances thereon, the longitudinal bores being extended into and connecting the opposite ends of the engine cylinder, a slide valve supported on the said journal rod having a central supply chamber and exhaust chambers at each side, and a packing within the valve comprising oppositely disposed cup members with opposed tube parts in spaced relation to each other to reciprocate and revolubly engage the said rod.

3. The combination with an engine cylinder having a center journal rod extension with ports and passages, a slide valve disposed on said journal rod extension comprising an outer shell with center and lateral compartments, one end of the shell fitting the said journal rod extension and the other being recessed with a counter bore through the center chamber, oppositely disposed outwardly flanged cup bearings in the said center chamber embracing said journal rod extension, a clamp member between the flanges of said cup bearings with air ports therethrough, and a clamp cover to clamp the said packings and separate the said chambers, as specified.

4. The combination with an engine cylinder having a center journal rod extension with ports and passages, a valve disposed on said journal rod extension comprising an outer shell with center and lateral compartments, one end of the shell fitting the said journal rod extension and the other being recessed with a counter bore through the center chamber, oppositely disposed outwardly flanged cup bearings in the said center chamber embracing said journal rod extension, and means for clamping the peripheries of the flanges of the said cup bearings, whereby the centers of the packings are flexibly supported.

In witness whereof I have hereunto set my hand.

GEORGE F. HOPKINS.